United States Patent Office 3,216,099
Patented Nov. 9, 1965

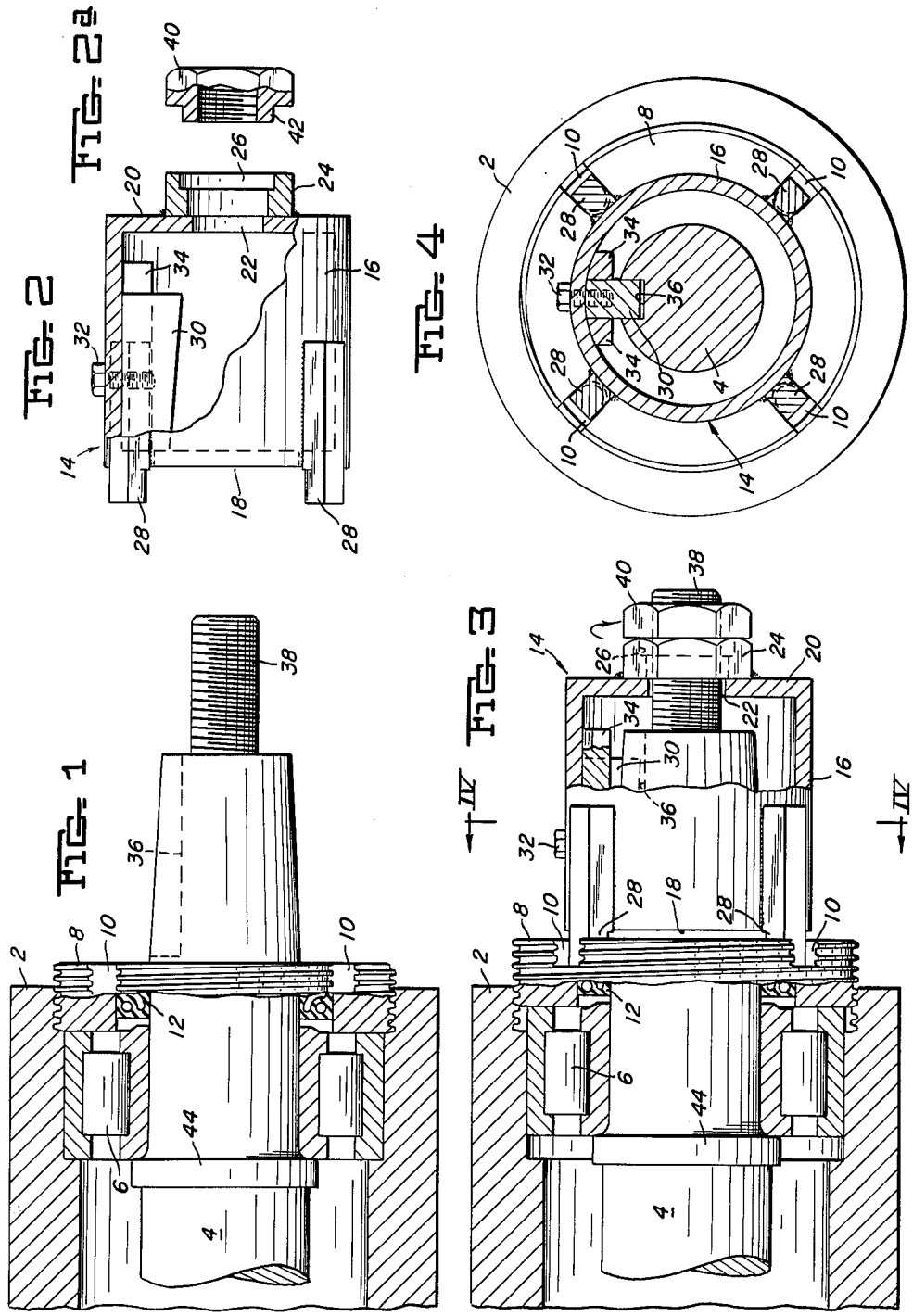

3,216,099
TOOL FOR REMOVING A DRIVE SHAFT
ASSEMBLY FROM A HOUSING
Tony Boss, Dragerton, Utah, assignor to United States
Steel Corporation, a corporation of New Jersey
Filed July 12, 1963, Ser. No. 294,551
1 Claim. (Cl. 29—240)

The present invention relates generally to a tool for removing a threaded member from a parent body and, more particularly, has as an object the provision of a tool for unscrewing a bearing-retainer ring from threaded engagement with the interior of a housing in which a shaft is journaled in anti-friction bearing means to effect removal of the bearing means and the shaft from the housing.

It is another object of the invention to provide a tool for simultaneously removing from a housing, a bearing-retainer ring threaded into the housing, anti-friction bearing means slidably disposed in the housing and retained therein by the retainer ring, and a shaft journaled in the bearing means.

These and other objects will become more apparent after referring to the following specification and attached drawing, in which:

FIGURE 1 is a vertical section view of a bearing-and-shaft housing assembly;

FIGURE 2 is a side elevational view partly in section of the main body of the tool of the invention;

FIGURE 2a is a side elevational view partly in section of the pilot nut element of the invention;

FIGURE 3 is a vertical sectional view partly in elevation showing the tool of the invention in use to disassemble the bearing-and-shaft assembly shown in FIGURE 1; and FIGURE 4 is a vertical sectional view taken along the line IV—IV of FIGURE 3.

Referring more particularly to the drawing, reference numeral 2 designates a drive-shaft housing in which a drive shaft 4 is journaled in a roller bearing 6. A retainer ring 8 having radial slots 10 circumferentially spaced about its outer face is threaded into the end of the housing to retain the bearing 6 and shaft 4 within the housing, as best shown in FIGURE 1. A circumferential flange 44 on the shaft 4 abuts the inner side of the bearing 6. The shaft 4 is provided with an externally-threaded projection 38 of reduced diameter on its projecting end for a purpose which will become apparent. A lubricant sealing ring 12 circumferentially mounted on the shaft 4 is also retained in position by the retainer ring 8.

All of the above features form no part of the present invention which will now be described in detail.

The tool of the invention is designated generally by reference numeral 14 and is comprised of a hollow, cylindrical, cup-like main body or hub 16 having an open end 18 and a substantially-closed end 20 which is provided with a central opening 22 therethrough. A hexagonal collar 24 having a counterbore 26 in its outer end surrounds the opening 22 on the outer surface of the end 20 of the body 16.

Four prongs 28 are spaced circumferentially about the periphery of the body 16 and project from the end 18 thereof, as best shown in FIGURES 2 and 3.

A key 30 is rigidly mounted on the interior of the body 16 by means of a screw 32. A seat for the key is formed on the interior wall of the body 16 by a pair of spaced lugs 34 which may be welded to the interior of the body wall extending axially therealong, as best shown in FIGURES 2, 2a, 3 and 4.

In operation, to unscrew the retainer ring 8 from the housing 2 to effect removal of the drive shaft 4, roller bearing 6 and the sealing ring 12 from the housing, the hub 16 is telescoped over the projecting end of the drive shaft so that the key 30 is engaged in a keyway 36 which extends axially along the projecting end of the drive shaft 4, and the prongs 28 are engaged in the radial slots 10 in the outer face of the retainer ring 8, as best shown in FIGURE 3. When the tool is thus positioned, threaded projection 38 on the end of the drive shaft 4 extends outwardly of the body 16 through the opening 22 and the hexagonal collar 24. As best shown in FIGURE 3, the interior diameter of the collar 24 is slightly greater than the outside diameter of the projection 38.

After the tool has been placed on the drive shaft as just described, a pilot nut 40 having a reduced diameter portion 42 on one end is threaded onto the projection 38 adjacent the collar 24 with the portion 42 fitting into the counterbore 26 of the collar to lock the tool in position on the projecting end of the drive shaft.

After the tool has been thus locked in position, a suitable wrench (not shown) is applied to the hexagonal collar 24 and the body 16 is turned thereby in counterclockwise direction so as to cause the retainer ring 8 to back out of the housing 2. Rotation of the body 16 also causes rotation of the drive shaft 4 by means of the key 30 on the interior of the body 16 which is in engagement with the keyway 36 on the shaft 4. Thus, the shaft 4 and the pilot nut 44 threaded thereon rotate at the same rate and in the same direction as the body 16 when the latter is turned. As the retainer ring 8 is unscrewed from the housing, it causes the rotating body 16 to move axially away from the housing and exert axial thrust on the pilot nut 40, which is threaded on and rotating with the shaft 4, to move the shaft outwardly of the housing. As the shaft 4 moves outwardly of the housing, the circumferential flange 44 on the shaft 4 pushes against the bearing 6 and causes it to slide outwardly of the housing along with the sealing ring 12.

If desired, the tool of the invention can be turned by applying power to the drive shaft instead of using a wrench. Rotation of the drive shaft will cause rotation of the body 16 through the key 30 and keyway 36 so that the retainer ring is unscrewed from the housing to effect removal of the drive shaft, bearing and sealing ring as described above.

While one embodiment of my invention has been shown and described, it will be apparent that other adaptations and modifications may be made without departing from the scope of the following claim.

I claim:

In a shaft assembly including a housing, anti-friction bearing means in said housing, a shaft journaled in said bearing means and having one end projecting outwardly of said housing, a circumferential flange on said shaft abutting one end of said bearing means, a bearing-retainer ring threaded into said housing and abutting the end of said bearing means opposite said circumferential flange, said retainer ring having radial slots in the outer face thereof, the improvement therewith of a tool for removing said bearing means and said shaft and said bearing-retainer ring from said housing which comprises a hub adapted to be telescoped over the projecting end of said shaft, prongs spaced circumferentially about said hub and projecting from one end thereof and adapted to enter said slots in the face of said ring, a key secured in said hub and adapted to coact with a keyway in said shaft end, said hub having its other end counterbored, a nut threaded on said shaft end adjacent the counterbored end of said hub, and a shoulder on said nut adapted to enter said counterbored end of said hub.

References Cited by the Examiner

UNITED STATES PATENTS 874,543  12/07  Scheuer.

FOREIGN PATENTS 347,057  4/31  Great Britain.

WILLIAM FELDMAN, *Primary Examiner.*
MILTON S. MEHR, *Examiner.*